US010191158B2

(12) United States Patent
Jardak et al.

(10) Patent No.: US 10,191,158 B2
(45) Date of Patent: Jan. 29, 2019

(54) GNSS RECEIVER CALCULATING A NON-AMBIGUOUS DISCRIMINATOR TO RESOLVE SUBCARRIER TRACKING AMBIGUITIES

(71) Applicants: CENTRE NATIONAL D'ETUDES SPATIALES, Paris (FR); M3 SYSTEMS, L'Union (FR)

(72) Inventors: Nabil Jardak, Muret (FR); Willy Vigneau, Muret (FR); François-Xavier Marmet, Muret (FR); Lionel Ries, Viviers les Montagnes (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 376 days.

(21) Appl. No.: 15/200,186

(22) Filed: Jul. 1, 2016

(65) Prior Publication Data
US 2017/0003399 A1 Jan. 5, 2017

(30) Foreign Application Priority Data
Jul. 3, 2015 (EP) .................................... 15306091

(51) Int. Cl.
*G01S 19/30* (2010.01)
*G01S 19/22* (2010.01)
(52) U.S. Cl.
CPC .............. *G01S 19/30* (2013.01); *G01S 19/22* (2013.01)
(58) Field of Classification Search
CPC ..................................................... G01S 19/30
See application file for complete search history.

(56) References Cited

U.S. PATENT DOCUMENTS 7,555,033 B2 * 6/2009 Lillo ...................... G01S 19/30
375/149
7,916,771 B2 * 3/2011 Julien ..................... G01S 19/30
342/357.22
(Continued)

FOREIGN PATENT DOCUMENTS

EP 2 382 484 B1 10/2014

OTHER PUBLICATIONS

Simons. "Advanced Receiver Design for Modernised GNSS Signals." Thesis Surrey Space Center, Faculty of Engineering and Physical Science, University of Surrey. 2014. pp. 1-158. (Year: 2014).*
(Continued)

*Primary Examiner* — Gregory C. Issing
(74) *Attorney, Agent, or Firm* — Meagher Emanuel Laks Goldberg & Liao, LLP

(57) ABSTRACT

A receiver, and associated process, for tracking a GNSS positioning signal comprising a carrier modulated by a subcarrier and a spreading code, the receiver comprising:
  at least one tracking loop configured to calculate a first pseudo range from said GNSS positioning signal,
  a first discrimination circuit (521) configured to calculate an ambiguous discriminator value from the subcarrier and the spreading code of said GNSS positioning signal,
  a calculation circuit (522) configured to calculate a value representative of a tracking error of said tracking loop,
  a second discrimination circuit (530) configured to select one of said ambiguous discriminator value and said value calculated by the calculation circuit, and to generate a first non-ambiguous discriminator value, an amplitude of which is based on an amplitude of the selected value, and a sign of which is a sign of said value calculated by the calculation circuit.

12 Claims, 9 Drawing Sheets

(56) References Cited

U.S. PATENT DOCUMENTS

| | | | | |
|---|---|---|---|---|
| 8,660,166 B2* | 2/2014 | Floch | ............ | G01S 19/30 370/503 |
| 2003/0231580 A1* | 12/2003 | Martin | ............ | G01S 19/02 370/203 |
| 2010/0104046 A1* | 4/2010 | Hodgart | ............ | G01S 19/29 375/340 |
| 2010/0124255 A1 | 5/2010 | Riley | | |

OTHER PUBLICATIONS

Ren et al. "Linear-Combined-Code-Based Unambiguous Code Discriminator Design for Multipath Mitigation in GNSS Receivers." Radio Engineering, vol. 21, No. 4, Dec. 2012. pp. 1-12. (Year: 2012).*

Jovanovic et al. "Two-Step Galileo E1 CBOC Tracking Algorithm: When Reliability and Robustness Are Keys!" International Journal of Navigation and Observation. vol. 2012, Article ID 135401. pp. 1-15. (Year: 2012).*

Wu et al. "Unambiguous Double Delta Discriminator for sine-phased BOC (n,n) Receiver." Journal of Global Positioning Systems. vol. 10. No. 2. 2011. pp. 1-8. (Year: 2011).*

European Search Report for 15306091.8, dated Jan. 5, 2016.

A. De Latour et al., "New BPSK, BOC and MBOC Tracking Structures", Proceedings of the 2009 International Technical Meeting of the Institute of Navigation (ITM 2009), Jan. 28, 2009, pp. 396-405, Anaheim, CA.

Jyh-Ching Juang et al., "Noncoherent BOC Signal Tracking Based on a Five-Correlator Architecture", IEEE Transactions on Aerospace and Electronic Systems, vol. 48, No. 3, Jul. 1, 2012, pp. 1961-1974IEEE Service Center, Piscataway, NJ, US.

* cited by examiner

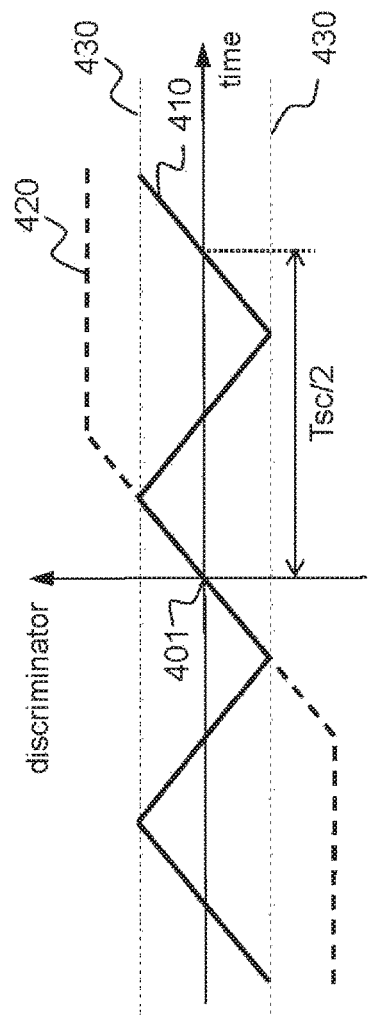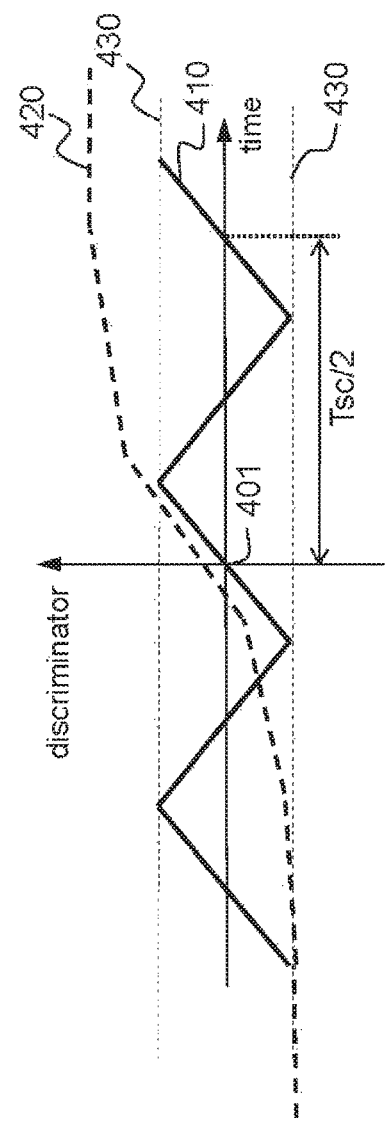

GNSS RECEIVER CALCULATING A NON-AMBIGUOUS DISCRIMINATOR TO RESOLVE SUBCARRIER TRACKING AMBIGUITIES

FIELD OF THE INVENTION

The present invention applies to the field of satellite navigation. More specifically, the invention allows a receiver to calculate a non-ambiguous discriminator value for tracking a GNSS positioning signal having multiple autocorrelation peaks.

BACKGROUND PRIOR ART

There are two Global Navigation Satellite Systems (GNSS) which have been fully deployed for a number of years (the US Global Positioning System, the Russian GLONASS) and two more which are under deployment (the Chinese Beidou Navigation Satellite System and the European Galileo system). These systems rely on the same principles: microwave radio signals are broadcast from a number of satellites which orbit in a non-geostationary orbit; the signals carry a PRN (Pseudo Random Noise) code which is correlated with a local replica in a receiver configured to receive the broadcast signals; when a receiver is capable of acquiring and tracking signals from a satellite, its processing capabilities demodulate the code signal using the correlation process, and calculate a pseudo-range, which is the distance between the receiver and the satellite. This pseudo-range is taken in combination with pseudo-range acquired from other satellites (generally three) to determine a position, velocity and time (PVT).

Some of the radio navigation signals transmitted by the satellites are known as BOC signals (Binary Offset Carrier modulation), where a carrier wave is first modulated by a PRN code, and then by a subcarrier. The resulting signal has a spectrum having two main lobes located on either side of the carrier frequency, thus allowing cohabitation with other signals using the same carrier frequency. BOC signals are referred to as BOC(m, n), where the chip rate of the code signal is n*1.023 Mcps (Mega Chips per second), and the subcarrier frequency is m*1.023 MHz. These signals are selected for GNSS positioning instead of the traditional BPSK modulated signals because they show a better precision. Different variants of the BOC signal are used by Galileo and Beidou and will be used by the GPS 3 system.

The tracking of BOC signals has proven to offer more precise and robust positioning information than tracking of BPSK signals, mainly thanks to the sharper slope of the autocorrelation function peak, and its larger bandwidth. However, unlike BPSK signals, BOC signals autocorrelation function shows multiple side peaks which compete with the main peak, and show magnitudes comparable to the magnitude of the main peak.

In presence of error sources like noise or interferers, tracking of BOC signals may result in synchronizing on one of the side peaks of the BOC intercorrelation function. The tracking loop may therefore get locked at the right position, on the main peak of the intercorrelation, or at a wrong position, on a side peak of the intercorrelation, which creates a ranging error which can be higher than 9.7 m (case of BOC(15, 2.5)).

Positioning signals can also be affected by multipath, due to reflections on the environment occurring during the signal propagation. These multipath reflections are particularly present when operating in an urban or indoor environment. The reception of multipath signals creates artifacts in the composite intercorrelation function of a composite signal, multipath peaks being shifted from the original peaks by a distance corresponding to the delay between the main path and the multipath.

A number of state of the art techniques are dealing with the issue of synchronizing the tracking on the main peak of a BOC signal, but these techniques do not sufficiently consider propagation in a multipath environment.

Among these techniques, the Double-Discriminator technique, described in European Patent EP 2 382 484 B1, involves the parallel calculation of two discriminators, based on the spreading code and the subcarrier component of the BOC signal. The first discriminator calculation, called a non-ambiguous discriminator calculation, leads to a non-ambiguous determination of a tracking position, unlike the second discriminator calculation, which is ambiguous. However, the second discriminator calculation is more precise and less sensitive to noise and multipath reflections than the first one. In the Double Discriminator technique, a selection unit is configured to compare the value of the first discriminator with a threshold, and to select the discriminator value used in the tracking loop depending on the result of this comparison. If this technique is known to be very accurate in a Gaussian propagation environment, the performances deteriorate when the propagation environment show multipath reflections. The main reason for these deteriorations comes from the fact that multipath reflections particularly affect the shape of the non-ambiguous discriminator. Thus, the comparison of this discriminator value with a threshold shows a significant number of false alarms and non detections.

SUMMARY OF THE INVENTION

It is an object of the invention to provide improvements over the Double-Discriminator technique by calculating a single non-ambiguous discriminator whose precision is equivalent to the precision of an ambiguous discriminator, removing thus the need of comparing a non-ambiguous discriminator value with a threshold, and the associated errors. Such a discriminator is used in a receiver for tracking a GNSS positioning signal, and shows accurate results when operating in a multipath reflections propagation environment.

To this effect, the invention discloses a receiver for tracking a GNSS positioning signal comprising a carrier modulated by a subcarrier and a spreading code. The receiver comprises:

- at least one tracking loop configured to calculate a first pseudo range from said GNSS positioning signal,
- a first discrimination circuit configured to calculate an ambiguous discriminator value from the subcarrier and the spreading code of said GNSS positioning signal,
- a calculation circuit configured to calculate a value representative of a tracking error of said GNSS positioning signal,
- a second discrimination circuit configured to select one of said ambiguous discriminator value and said value calculated by the calculation circuit, and to generate a first non-ambiguous discriminator value, an amplitude of which is based on an amplitude of the selected value, and a sign of which is a sign of said value calculated by the calculation circuit.

Advantageously, the second discrimination circuit selects between the ambiguous discriminator value and the value calculated by the calculation circuit based on a control signal.

Advantageously, the value calculated by the calculation circuit is smoothed over a plurality of consecutive measurements.

In one embodiment according to the invention, the calculation circuit is configured to calculate a second non-ambiguous discriminator from correlations between the subcarrier and spreading code of the GNSS positioning signal and prompt, early and late positions of a reference signal.

In one embodiment according to the invention, the calculation circuit is configured to calculate a second non-ambiguous discriminator from a correlation between the spreading code of the GNSS positioning signal and a reference signal.

In one embodiment according to the invention, the calculation circuit is configured to measure a difference between said first pseudo range, and a second pseudo range calculated by a tracking loop based on a second non-ambiguous discriminator.

In one embodiment according to the invention, the calculation circuit is configured to measure a difference between said first pseudo range, and a second pseudo range determined from known receiver position, satellite position and time.

The invention furthermore comprises a method for determining a first non-ambiguous discriminator value for tracking a GNSS positioning signal comprising a carrier modulated by a subcarrier and a spreading code in a tracking loop of a receiver. The method comprises:
- a first step of calculating an ambiguous discriminator from the subcarrier and the spreading code of said GNSS positioning signal,
- a second step of calculating a value representative of a tracking error of said GNSS positioning signal,
- a third step of generating a first non-ambiguous discriminator value, an amplitude of which is based on one of said ambiguous discriminator calculated in the first step and said value calculated in the second step, and a sign of which is a sign of the value calculated in the second step.

In one embodiment of the method for determining a first non-ambiguous discriminator value according to the invention, the second step of calculating a value representative of a tracking error of said GNSS positioning signal comprises calculating a second non-ambiguous discriminator from correlations between the subcarrier and spreading code of the GNSS positioning signal and a reference signal.

In one embodiment of the method for determining a first non-ambiguous discriminator value according to the invention, the second step of calculating a value representative of a tracking error of said GNSS positioning signal comprises calculating a second non-ambiguous discriminator from a correlation between the spreading code of the GNSS positioning signal and a reference signal.

In one embodiment of the method for determining a first non-ambiguous discriminator value according to the invention, the second step of calculating a value representative of a tracking error of said GNSS positioning signal comprises measuring a difference between a first pseudo range calculated by a tracking loop based on the first non-ambiguous discriminator, and a second pseudo range calculated by a tracking loop based on a second non-ambiguous discriminator.

In one embodiment of the method for determining a first non-ambiguous discriminator value according to the invention, the second step of calculating a value representative of a tracking error of said GNSS positioning signal comprises measuring a difference between a first pseudo range calculated by a tracking loop based on the first non-ambiguous discriminator, and a second pseudo range determined from known receiver position, satellite position and time

BRIEF DESCRIPTION OF THE DRAWINGS

The invention will be better understood and its various features and advantages will emerge from the following description of a number of exemplary embodiments and its appended figures in which:

FIGS. 4a and 4b respectively represent the shape of BOC discriminators in a Gaussian and multipath environment;

DETAILED DESCRIPTION OF THE INVENTION

The examples described above are given as illustrations of embodiments of the invention. They do not in any way limit the scope of the invention which is defined by the following claims.

Figure 1:
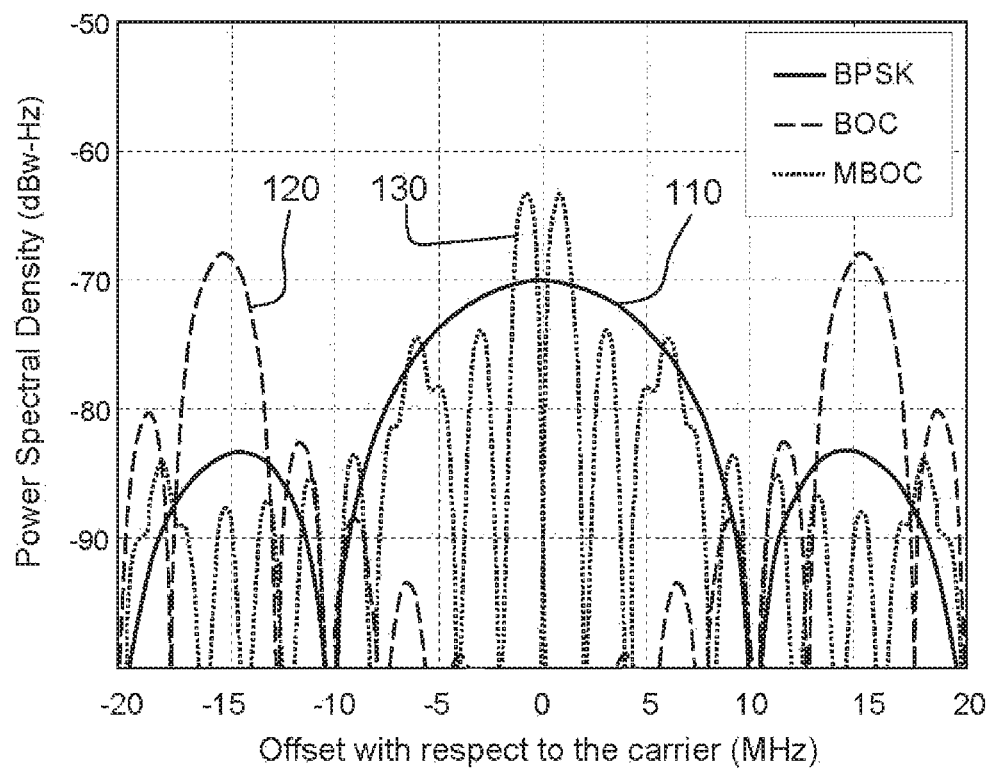
FIG. 1 represents exemplary spectrums of a BPSK, a BOC, and a MBOC signal, according to the prior art.

FIG. 1 represent exemplary spectrums of a BPSK (110), a BOC (120), and a MBOC (130) signal, according to the prior art.

On FIG. 1, spectrums are represented with respect to the carrier frequency. It can be observed that the BPSK spectrum 110 is centered on the carrier frequency.

Generating a BOC signal comprises modulating the carrier of the signal by a code and a subcarrier. BOC modulation is usually described as:

$$x(t) = \sqrt{\sqrt{A}} \cdot d(t) \cdot c(t) \cdot s(t) \cdot \exp(j[2\pi f_c t + \theta])$$

where $\sqrt{A}$ is the complex signal's amplitude, $d(t)$ the data transmitted (if any), $c(t)$ the pseudo-random noise (PRN) code signal, $s(t)$ the subcarrier signal, $f_c$ and $\theta$ the carrier frequency and phase.

As a consequence of the modulation by the subcarrier signal, the BOC spectrum 120 is split in two side bands distributed on either side of the nominal carrier frequency, with a frequency shift equivalent to the subcarrier frequency. Each lobe of the signal can be seen as a BPSK spectrum.

Such BOC signals are used for satellite positioning, the precision being better than BPSK signals, and the cohabitation with other signals using the same carrier frequency being easier, due to the subcarrier modulation.

BOC modulation has several variants, among which the sine BOC, cosine BOC, ALTBOC, or Multiplex BOC (MBOC), which spectrum is represented by curve 130. MBOC modulation has been proposed for Galileo and modernized GPS signals, and combines a sine binary offset carrier SinBOC (1, 1) with a SinBOC (m,n). The invention applies identically whatever the BOC variant and the (m, n) set of parameters; the only requirement being that the signal is composed of a carrier wave modulated by a code and a subcarrier, with m≥n.

The BOC signals can be demodulated using the entire signal, including the code and subcarrier components, or considering only one lobe. In the latter case, the subcarrier signal of the BOC signal is suppressed by considering only one lobe of BOC signal, and shifting it by the appropriate frequency to remove the subcarrier contribution. The resulting signal still comprises the code information, and can be demodulated as a classic BPSK signal, with a 3 dB loss due to the processing of only half of the signal power spectrum density.

Figure 2A:
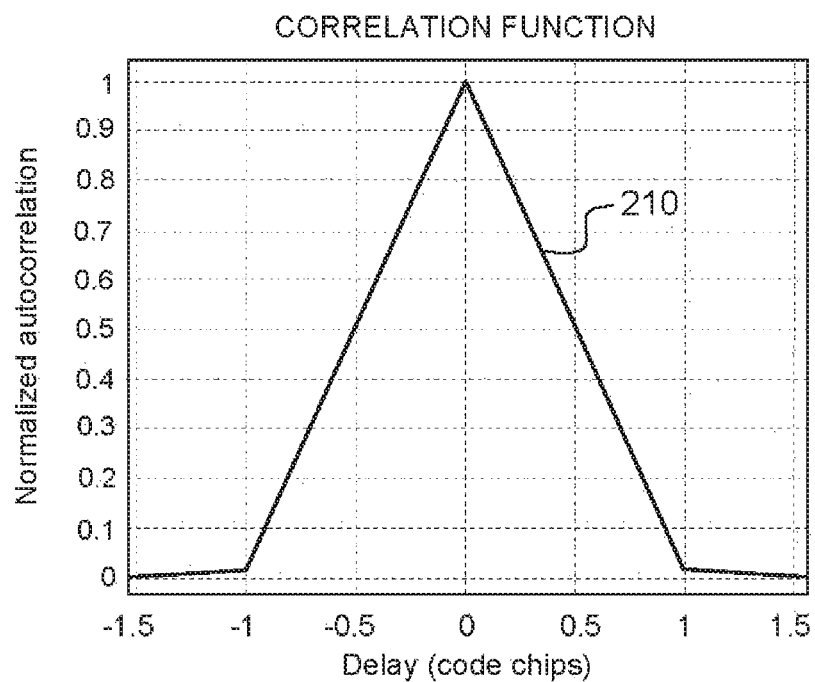
FIGS. 2a and 2b respectively represent an auto-correlation function of a BPSK signal and a BOC signal.
Figure 2B:
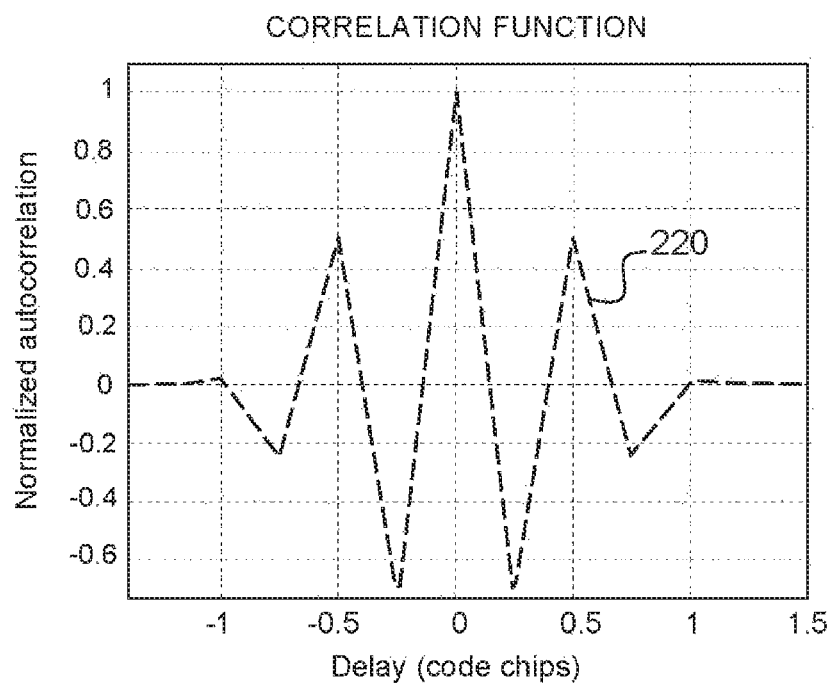

FIGS. 2a and 2b respectively represent examples of autocorrelation functions for a BPSK signal (210) and a BOC signal (220) according to the prior art, over a duration of two time chips around the perfect synchronization delay. The BPSK signal autocorrelation shows only one peak on this interval. Its maximum represents the perfect synchronization position, and can be determined in a non-ambiguous way. The BOC signal autocorrelation shows multiple peaks. As the main peak of the BOC autocorrelation is sharper than the BPSK signal autocorrelation peak, the tracking precision is better. However, in some circumstances (noisy environment, multiple propagation paths, . . . ) the tracking position can be associated with one of the side peaks, thus resulting in localization errors, which is why the autocorrelation of a BOC signal is known to be ambiguous.

The correlation function is used in the reception chain to calculate a discriminator, for sensing the synchronization error based on the result of the intercorrelation between the received signal and a reference signal constructed from an internal time reference. The internal time reference is provided by a local oscillator, called VCO (Voltage Controlled oscillator) or NCO (Numerically Controlled Oscillator), controlled by a loop filter delivering a control signal calculated from a discriminator value. The local oscillator's phase is associated to the information transported in the received message, to measure a pseudo range. The phase of the oscillator is also used to generate the subcarrier and code reference signals.

Thus, the value of the discriminator is used in the receiver chain to detect misalignments between the local and the received code signals. It is equal to zero when the tracking position is right (the local time reference is synchronized with the received signal), and has a value proportional to the time shift that must be applied to the oscillator to recover from tracking errors.

As the autocorrelation function of a BOC signal is ambiguous, a discriminator value constructed from the correlation between a received BOC signal and a reference signal, shows multiple peaks, and is known to be ambiguous. A tracking based on the value of an ambiguous discriminator is very precise, but can be locked on a side correlation peak, and leading thus to positioning errors.

Non-ambiguous correlations can be obtained from BOC signals. First, only one lobe of the BOC signal can be considered, and frequency shifted so that the subcarrier information is suppressed. This signal is equivalent to a BPSK signal, only showing one peak, so the resulting discriminator value is non-ambiguous. Second, a non-ambiguous discriminator calculation can be obtained considering the envelope of the ambiguous correlation by removing the subcarrier information. This non-ambiguous discriminator calculation, referred in the prior-art as a BPSK-like discriminator, is quite similar to the discriminator calculation of the BPSK signal.

Figure 3:
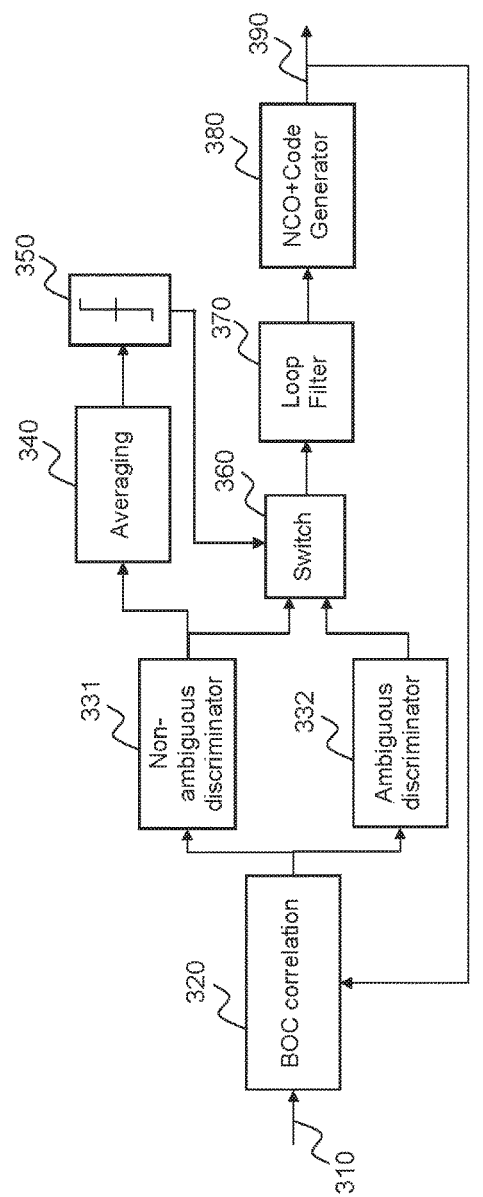
FIG. 3 represents a Double Discriminator Technique receiver structure, according to prior art.

FIG. 3 represents a Double Discriminator technique receiver structure, according to prior art.

In the Double Discriminator technique, a tracking loop takes as input a received BOC signal 310. This signal is correlated in 320 with a reference signal, a combination of correlations being used to calculate a non-ambiguous (BPSK-like) discriminator 331 and an ambiguous discriminator 332. These calculations require combining correlations results from the in-phase and quadrature phase carrier signal, considering the full received BOC signal (including the subcarrier and spreading code). Correlations with prompt, early and late positions of the reference signal are used to calculate the non-ambiguous discriminator. The non-ambiguous discriminator is filtered 340, and compared 350 with a threshold. A switch 360 is controlled from the result of this comparison, in order to select one of the non-ambiguous discriminator calculation and the ambiguous discriminator calculation as input of a loop filter 370, to control an oscillator 380. A pseudo range 390, used in a navigator of the GNSS receiver, along with pseudo ranges acquired from other positioning signals to determine a position velocity and time, is calculated from the phase of the oscillator, and the information transmitted in the positioning signal.

When the ambiguous discriminator calculation is tracking the main correlation peak, the value of the non-ambiguous discriminator is small. The pseudo-range estimation is therefore calculated from the ambiguous discriminator, and is very precise. But when the ambiguous discriminator calculation is tracking a side correlation peak, the value of the non-ambiguous discriminator increases. When it exceeds a threshold, the switch 360 selects the non-ambiguous discriminator calculation for a predetermined period of time, instead of the ambiguous discriminator calculation. As a result, the precision of the estimated pseudo-range is lower, but the tracking loop, using the non-ambiguous discriminator value, will gradually converge toward the main intercorrelation peak. Once the tracking loop has converged, the ambiguous discriminator calculation is reselected for closing the tracking loop.

This technique is subject to false alarm and missed detection in a severe reception environment. When a false alarm occurs, it leads to selecting the non-ambiguous discriminator instead of the ambiguous one, the resulting pseudo range having a lower precision, but not being wrong. Contrarily, techniques based on sudden phase jumps to recover from a side peak tracking track a wrong peak after a situation of false alarm.

Multipath reflections of the received signal affect the shape of the discriminators, and particularly the shape of the non-ambiguous discriminator, as non-ambiguous correlation's main peak is larger than the BOC correlation's main peak.

FIGS. 4a and 4b respectively illustrate the behavior of BOC ambiguous and non-ambiguous discriminators in a single path and in a multiple path environment. FIGS. 4a and 4b represent a time duration of about one subcarrier chip, centered on the right tracking delay 401 (main correlation peak tracking).

On FIG. 4a is represented a non-ambiguous discriminator 410 in a single path environment. This discriminator is null when the tracking error is null, and its sign and amplitude depend on the tracking error, and the chip spacing between the correlation early position and late position. As this discriminator is non-ambiguous, it only crosses the zero value once in this time interval. On the contrary, the ambiguous discriminator 420 is null when the tracking error is null, but also when the tracking positions match a side peak of the intercorrelation function. What is remarkable is that, when the tracking is performed on a side correlation peak, the ambiguous discriminator value is null, but the non-ambiguous discriminator value exceeds a threshold 430. The Double Discriminator technique uses this property to detect tracking on side correlation peaks.

On FIG. 4b, the same discriminators are represented, in a multipath propagation environment. The robustness of the non-ambiguous discriminator to multipath reflections is comparable to the robustness of a BPSK modulation. The robustness of the ambiguous discriminator, based on the BOC signal including the subcarrier and spreading code, is better. As a result, the non-ambiguous discriminator 420 is more affected by multipath than the ambiguous one. This results in having a non-ambiguous discriminator value which might not be null when the tracking error is null, and might not reach the threshold used in the Double Discriminator technique for detecting tracking on side peaks. Therefore, the structure of the Double Estimator technique, and in particular the comparison of a non-ambiguous discriminator value with a threshold, results in unreliable operation in a multipath environment.

Figure 5:
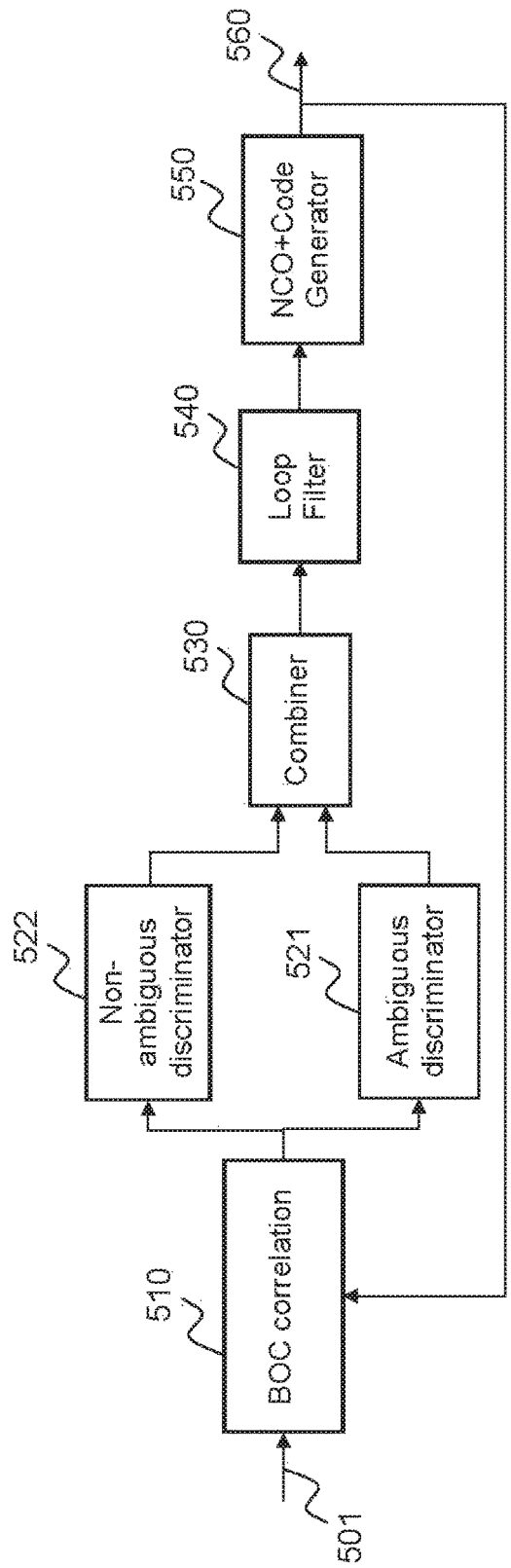
FIG. 5 represents a first embodiment of a receiver according to the invention, comprising the calculation of an ambiguous discriminator and a non-ambiguous discriminator on the BOC signal.

FIG. 5 represents a first embodiment of a receiver according to the invention, comprising the calculation of an ambiguous discriminator value and a non-ambiguous discriminator value on a BOC positioning signal, to determine a first non-ambiguous discriminator value. The input 501 of the circuit shown on FIG. 5, is complex base band or intermediate frequency BOC positioning signal. The carrier loop, mandatory in a GNSS receiver, is not represented, as its implementation is known from prior art.

On FIG. 5, a tracking loop is configured to calculate a pseudo range 560 from a GNSS positioning signal. In the tracking loop, a first circuit uses correlations 510 between the received positioning signal and reference signals, to determine an ambiguous discriminator value 521.

A calculation circuit calculates a second non-ambiguous discriminator 522, from correlations on the positioning signal considered as a BPSK signal by removing the subcarrier information, or on the positioning signal considering the envelope of the BOC positioning signal. This second non-ambiguous discriminator is representative of the tracking error on the GNSS positioning signal.

An exemplary embodiment of a BPSK-like calculation used to determine the second non-ambiguous discriminator consists in performing the correlation of the received positioning signal with prompt, early and late versions of a reference signal, including the subcarrier and spreading code information of the signal.

The calculation of the second non-ambiguous discriminator thus comprises calculating:

$$EIs = \int r(t) * c\left(t - \frac{\Delta}{2}\right) * s_s\left(\varphi - \frac{\Delta}{2}\right) * \sin(\theta),$$

$$EQs = \int r(t) * c\left(t - \frac{\Delta}{2}\right) * s_s\left(\varphi - \frac{\Delta}{2}\right) * \cos(\theta),$$

$$EIc = \int r(t) * c\left(t - \frac{\Delta}{2}\right) * s_c\left(\varphi - \frac{\Delta}{2}\right) * \sin(\theta),$$

$$EQc = \int r(t) * c\left(t - \frac{\Delta}{2}\right) * s_c\left(\varphi - \frac{\Delta}{2}\right) * \cos(\theta),$$

$$PIs = \int r(t) * c(t) * s_s(\varphi) * \sin(\theta),$$

$$PQs = \int r(t) * c(t) * s_s(\varphi) * \cos(\theta),$$

$$PIc = \int r(t) * c(t) * s_c(\varphi) * \sin(\theta),$$

$$PQc = \int r(t) * c(t) * s_c(\varphi) * \cos(\theta),$$

$$LIs = \int r(t) * c\left(t + \frac{\Delta}{2}\right) * s_s\left(\varphi + \frac{\Delta}{2}\right) * \sin(\theta),$$

$$LQs = \int r(t) * c\left(t + \frac{\Delta}{2}\right) * s_s\left(\varphi + \frac{\Delta}{2}\right) * \cos(\theta),$$

$$LIc = \int r(t) * c\left(t + \frac{\Delta}{2}\right) * s_c\left(\varphi + \frac{\Delta}{2}\right) * \sin(\theta),$$

$$LQc = \int r(t) * c\left(t + \frac{\Delta}{2}\right) * s_c\left(\varphi + \frac{\Delta}{2}\right) * \cos(\theta),$$

where:
Exx represents an early correlation,
Pxx represents a prompt correlation,
Lxx represents a late correlation,
xIx represents a correlation using the in-phase carrier input signal,
xQx represents a correlation using the quadrature carrier input signal,
xxs represents a correlation using the in-phase subcarrier signal,
xxc represents a correlation using the quadrature subcarrier signal,
r(t) is the input signal on carrier frequency, on intermediate frequency or baseband,
c(t) is the code reference signal,
$s_s(t)$ is the in-phase subcarrier reference signal,
$s_c(t)$ is the quadrature subcarrier reference signal,
θ is the carrier phase,
φ is the subcarrier phase, equivalent to the code phase, but formulated in subcarrier periods,
Δ is the spacing between the early and late positions.

The second non-ambiguous discriminator value (BPSK-like) can be determined calculating:

$$E^2 = EIs^2 + EQs^2 + EIc^2 + EQc^2$$

$$L^2 = LIs^2 + LQs^2 + LIc^2 + LQc^2$$

$$D_{NA} = \frac{2 - \Delta}{2}(E^2 - L^2)/(E^2 + L^2),$$

where $D_{NA}$ is the second non-ambiguous discriminator value.

The ambiguous discriminator value can be determined calculating:

$$E^2 = EIs^2 + EQs^2$$
$$L^2 = LIs^2 + LQs^2$$
$$D_A = \frac{2-\Delta}{2}(E^2 - L^2)/(E^2 + L^2),$$

where $D_A$ is the ambiguous discriminator value.

The previous calculations of the second non-ambiguous and the ambiguous discriminators are known from prior art, and provided as illustrative example. Other calculations achieving similar results are possible, some of these techniques being described in European Patent EP 2 049 914 B1. The invention applies equally regardless of the method for calculating the ambiguous and second non-ambiguous discriminators.

Back to FIG. 5, a second discrimination circuit 530 calculates a first non-ambiguous discriminator from the second non-ambiguous discriminator and the ambiguous discriminator.

The amplitude of an intermediate non-ambiguous discriminator is obtained considering the amplitude of the ambiguous discriminator, by calculating the absolute value of the ambiguous discriminator, or any other similar calculation, as for example the square of the ambiguous discriminator.

The sign of the intermediate non-ambiguous discriminator is obtained considering the sign of the second non-ambiguous discriminator. This sign is combined with the amplitude of the ambiguous discriminator to generate the intermediate non-ambiguous discriminator.

The calculated intermediate discriminator having the sign of the second non-ambiguous discriminator is therefore non-ambiguous. Its value being the value of the ambiguous discriminator, a pseudo range calculated in a tracking loop considering this discriminator has a high precision.

The tracking loop of the receiver further comprises a loop filter 540, filtering some of the noise of the discriminator, and generating a control signal for adjusting a NCO or VCO 550. From the phase of the oscillator, and the information transported in the received positioning message, a pseudo range can be determined.

However, the ambiguous discriminator shows some null values, some of them corresponding to tracking a side peak of the correlation on the BOC positioning signal. The calculated intermediate non-ambiguous discriminator shows the same null values, and a tracking loop based on the intermediate discriminator shall not recover from tracking on a side correlation peak, and will deliver a biased pseudo range.

To cope with this issue, it is proposed that the tracking loop selects alternately the value of the intermediate non-ambiguous discriminator and the value of the second non-ambiguous discriminator, to calculate the amplitude of the first non-ambiguous discriminator. The aim of this selection is to move away from situations where the output of the intermediate discriminator is null. The selection shall be driven by a control signal, whether hardware or software, internal or external to the discrimination circuit, as for example a signal driven by a clock or a programmed logic. Alternately means that the selection is made back and forth between the two values, but not necessarily at a regular rhythm, and in identical proportions. This changeover can be performed regularly, as for example following a cyclic pattern selecting X times the value of the intermediate non-ambiguous discriminator and Y times the value of the second non-ambiguous discriminator, using a random draw following a probability law, or any other technique that guaranties performing the selection between the two discriminators at a determined rate. The control signal can be dynamically adapted depending on the propagation conditions (like for example noise, multipath reflections, interferers), the environment (indoor or outdoor), or the required resulting discriminator precision (starting with a low precision and thereafter gradually increasing it). It can also be dynamically adapted depending on the value of the first or second non-ambiguous discriminator, considering that the second non-ambiguous discriminator must be selected with a higher rate when its value is high, or when the value of the ambiguous discriminator is low. As using the second non-ambiguous discriminator decreases the precision of the tracking loop, and as situations wherein the value of the ambiguous discriminator is null have a limited occurrence probability, the use of the second non-ambiguous discriminator can be performed at a low ratio. A good ratio for selecting the second non-ambiguous discriminator instead of the intermediate non-ambiguous discriminator in the tracking loop shall be in a range of 1% to 20%.

The tracking loop using the calculated first non-ambiguous discriminator shows good performances as it is based on the information resulting from a non-ambiguous and an ambiguous analysis of the received signal, just like in the Double Discriminator technique. But, unlike this technique, it is also robust to multipath reflections as:
  only the sign, and not the amplitude, of the second non-ambiguous discriminator is considered, the second non-ambiguous discriminator being less robust to multipath reflections than the ambiguous one,
  the implementation does not require comparison with a threshold, which is an issue when dealing with interferers like multipath reflections.

The pseudo range 560 calculated using this first non-ambiguous discriminator has the same properties of high accuracy and robustness to multipath reflections.

On FIG. 5, the second non-ambiguous discriminator is a BPSK-like discriminator considering the BOC signal, using prompt, early and late positions of the reference signal. The same result can be achieved considering a BPSK version of the BOC positioning signal by suppressing the subcarrier information.

Figure 6:
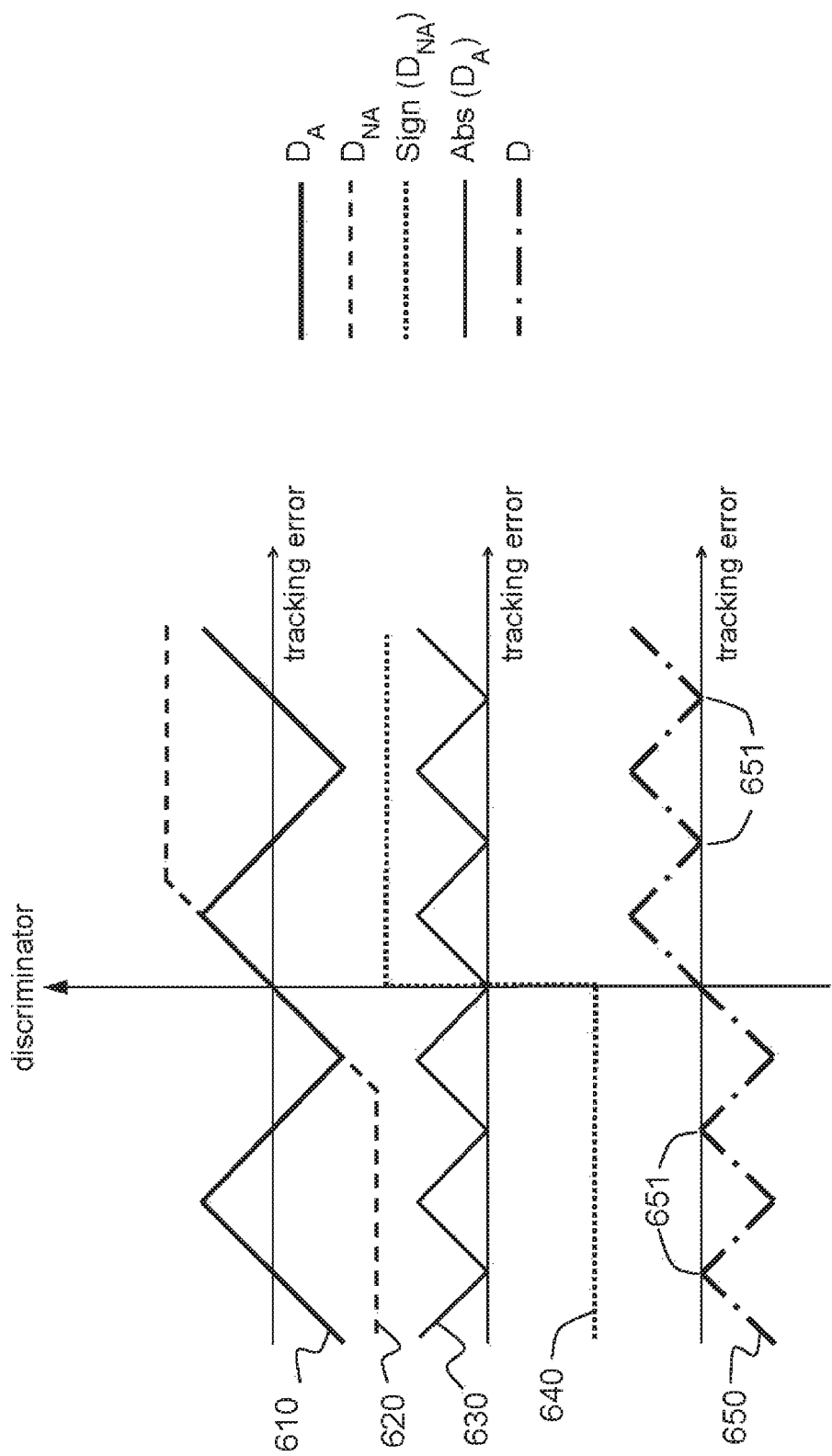
FIG. 6 represents the calculations performed by the receiver to produce a non-ambiguous discriminator.

FIG. 6 represents the calculations performed by the receiver to produce the intermediate non-ambiguous discriminator.

On FIG. 6 are represented discriminators values as a function of the tracking error. The curve 610 is the value of an ambiguous discriminator. This value is null when the tracking error is null, but is also null each time the tracking error matches a side peak of the correlation function (referred to as steady state nulls) and between two side peaks positions (near where the BOC correlation function cancels), these latter positions are not steady states for the standard BOC tracking loop. The distance between two consecutive steady state nulls is equal to half the subcarrier period of the positioning signal. Such an ambiguous discriminator can be used in a tracking loop only when the tracking error is comprised in an interval of one subcarrier period around the correct tracking position.

The curve 620 is the value of a second non-ambiguous discriminator. This value is null only when the tracking error is null, the sign of the non-ambiguous discriminator being different depending on the direction of the tracking error.

From the ambiguous discriminator 610 is constructed a new discriminator 630, which value is provided by the amplitude of the ambiguous discriminator, for example by removing the sign information.

From the second non-ambiguous discriminator 620 is constructed another new discriminator 640, which value is provided by the sign of the non-ambiguous discriminator.

The combination of the two new discriminators 630 and 640 makes possible to construct the intermediate non-ambiguous discriminator 650, which is non-ambiguous due to the use of the sign of the second non-ambiguous discriminator, and which is precise due to the use of the amplitude value of the ambiguous discriminator. It can be observed that this discriminator is null in 651, some of them corresponding to tracking position on a side peak of the correlation function, which is the reason why this intermediate non-ambiguous discriminator shall be used alternately with the second non-ambiguous discriminator in the tracking loop, the ratio for selecting the second non-ambiguous discriminator over the intermediate non-ambiguous discriminator being determined in order to deal with the null values of the intermediate discriminator while having only a limited impact on the precision of the measurement.

In the case where the amplitude of the ambiguous discriminator is determined using a sign function, the discriminator used in the tracking loop can be expressed as:

$$D(n)=x \cdot |D_A(n)| \cdot \text{sign}(D_{NA}(n))+(1-x) \cdot D_{NA}(n),$$

where:
- $D(n)$ is the first non ambiguous discriminator calculated by the discrimination circuit 530 for the measurement n,
- $D_A(n)$ is the ambiguous discriminator,
- $D_{NA}(n)$ is the second non-ambiguous discriminator,
- x is a variable, which value is 1 or 0 depending on a probability law, a cyclic pattern or any other scheme, to control a selection between the intermediate non-ambiguous discriminator and the second non-ambiguous discriminator.

As the second non-ambiguous discriminator is less robust than the ambiguous discriminator, its value can be smoothed over a few measurements, in order to further reduce the processing noise of the tracking loop and increase its robustness.

This smoothing can be a filtering of the values, or a simple sum of the second non-ambiguous discriminator values, as only the sign of this measurement is considered. In that case, the resulting first non-ambiguous subcarrier can be expressed as:

$$D(n)=x \cdot |D_A(n)| \cdot \text{sign}(\Sigma_{k=n-M+1}^{n} D_{NA}(k))+(1-x) \cdot D_{NA}(n),$$

where M is the number of values considered for smoothing the second non-ambiguous discriminator.

The invention can be implemented in a GNSS receiver on any appropriate hardware architecture. It applies to a GNSS positioning signal at the output of a RF chain, preferably but not restricted to in baseband or intermediate frequency. The various tracking loops, discriminator circuits and calculation circuits can be implemented using analog components. If the input signal is digitized, they can also be implemented on a calculation machine as for example a software reprogrammable calculation machine (as for example a microprocessor, a microcontroller, or a digital signal processor (DSP)) or a dedicated calculation machine (as for example a Field Programmable Gate Array (FPGA), or an Application Specific Integrated Circuit (ASIC)). Any intermediate combination of analog and digital components is possible.

Figure 7:
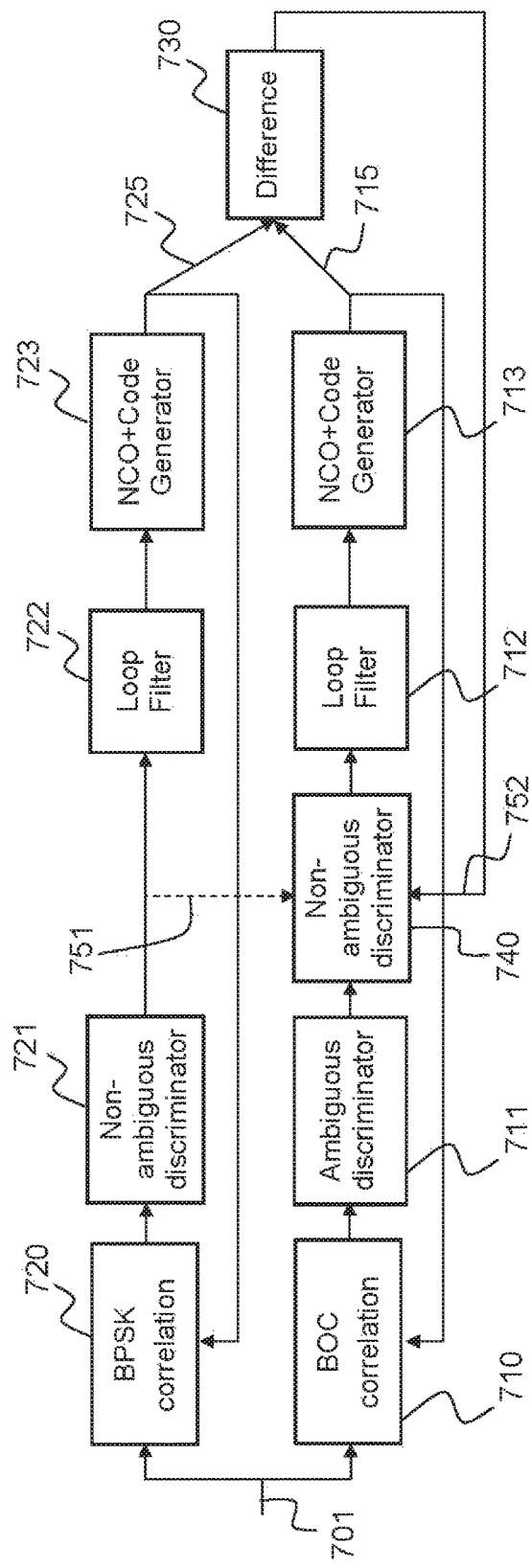
FIG. 7 represents a second embodiment of a receiver according to the invention, comprising the calculation of an ambiguous discriminator on the BOC signal, and a spreading code tracking loop.

FIG. 7 represents a second embodiment of a receiver according to the invention, comprising the calculation of an ambiguous discriminator on the BOC signal, and a spreading code tracking loop;

On FIG. 7, the received signal 701 is processed by two tracking loops in parallel. The first tracking loop comprises a circuit for performing correlations 710 on the BOC positioning signal, and calculating an ambiguous discriminator 711. The first tracking loop further comprises a loop filter 712 taking as an input a discriminator, and controlling an oscillator 713, from which is determined a first pseudo range 715. As this pseudo range is calculated from a tracking loop considering the full BOC positioning signal (subcarrier+spreading code), this pseudo range is noted $\tau_{BOC}$.

The second tracking loop comprises a circuit for performing correlations 720 considering the received signal as a BPSK signal by removing the subcarrier information. From the correlations are determined a second non-ambiguous discriminator 721, representative of a tracking error of this loop, which inputs a loop filter 722 for controlling a second oscillator 723. A non-ambiguous pseudo range $\tau_{BPSK}$ is determined from the phase of the oscillator.

A calculation circuit 730 is configured to measure the difference $\tau_{BPSK}-\tau_{BOC}$. The pseudo range $\tau_{BOC}$ being determined from an ambiguous discriminator, it can result of a side peak tracking. The pseudo range $\tau_{BPSK}$ being non-ambiguous, its precision is lower but it guaranties tracking on a main peak. Thus, the difference is representative of a tracking error of the first tracking loop. The precision of this measurement is not high, as $\tau_{BPSK}$ is determined considering the received signal as a BPSK signal, but a high precision is not required, as only the sign of the difference is considered. To improve the precision of this measurement, the BPSK pseudo range $\tau_{BPSK}$ and/or the measured difference, can be smoothed over successive measurements.

In an alternative embodiment, the second tracking loop can determine a non-ambiguous pseudo range considering the BOC signal by determining a BPSK-like non-ambiguous discriminator. This solution is not preferred as its implementation cost is higher than a tracking loop considering the BOC signal as a BPSK signal.

A second discrimination circuit 740 calculates a first non-ambiguous discriminator from the amplitude of the ambiguous discriminator 711, and the measured difference 730. As in FIG. 5, an intermediate non-ambiguous discriminator is constructed, having the amplitude of the ambiguous discriminator and the sign of the measured difference. This intermediate discriminator is non-ambiguous, its shape being the same as the non-ambiguous discriminator 650 of FIG. 6. In order to cope with the issue of the null value of the intermediate non ambiguous discriminator, a second non-ambiguous discriminator is used alternately with the intermediate non-ambiguous discriminator to construct the first non-ambiguous discriminator. The first discriminator is non-ambiguous, and addresses the input of the loop filter 712 of the first tracking loop.

In one embodiment of the invention, the second non-ambiguous discriminator is the non-ambiguous discriminator 751 calculated in the second tracking loop, considering the positioning signal as a BPSK signal.

The first discriminator can thus be expressed as:

$$D(n)=x \cdot |D_A(n)| \cdot \text{sign}(\tau_{BPSK}-\tau_{BOC})+(1-x) \cdot (D_{NABPSK}),$$

where $D_{NABPSK}$ is the second non-ambiguous discriminator 721 calculated in the second tracking loop.

In another embodiment of the invention, the second non-ambiguous discriminator 752 is the value of the difference between $\tau_{BOC}$ and $\tau_{BPSK}$.

Thus, the first discriminator can be expressed as:

$$D(n)=x \cdot |D_A(n)| \cdot \text{sign}(\tau_{BPSK} - \tau_{BOC}) + (1-x) \cdot (\tau_{BPCK} - \tau_{BOC}).$$

Figure 8:
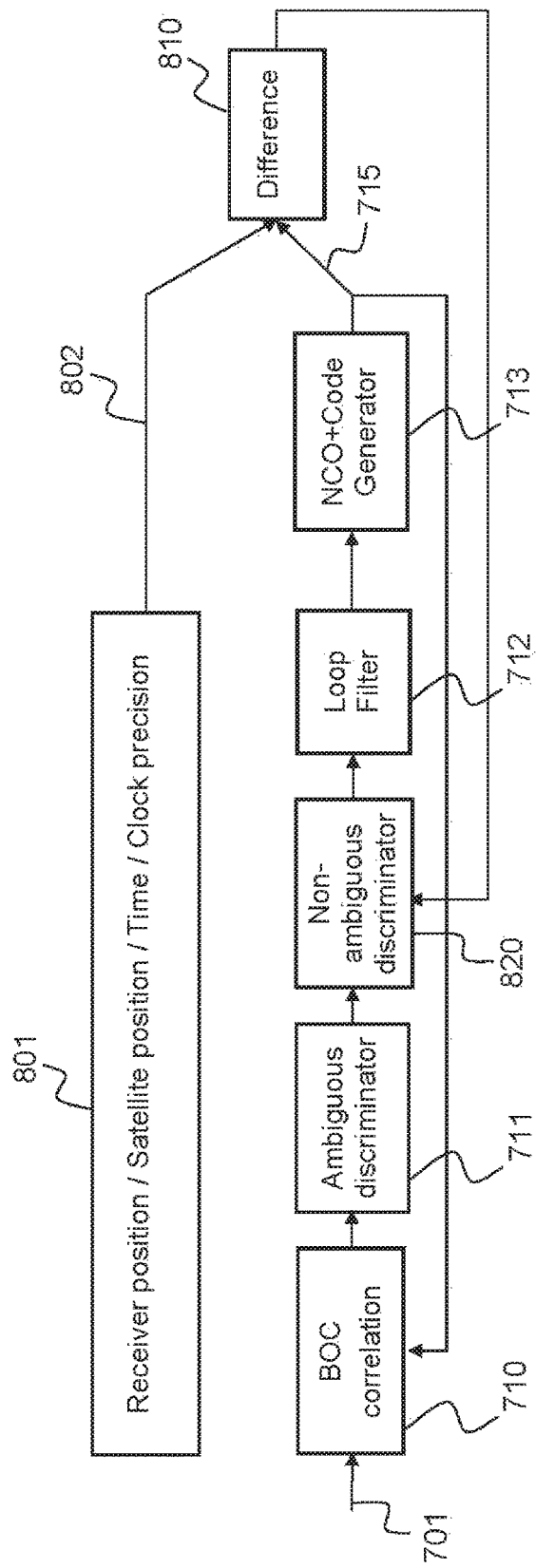
FIG. 8 represents a third embodiment of a receiver according to the invention, comprising the calculation of an ambiguous discriminator on the BOC signal, and the calculation of a pseudo range from known positions of the receiver and satellite.

FIG. 8 represents a third embodiment of a receiver according to the invention, comprising the calculation of an ambiguous discriminator on the BOC signal, and the calculation of a pseudo range from known positions of the receiver and satellite.

On FIG. 8, a tracking loop similar to the first tracking loop of FIG. 7, comprises calculating correlations 710 on the received BOC positioning signal 701 to determine an ambiguous discriminator 711. The tracking loop further comprises a loop filter 712, which controls an oscillator 713. From this tracking loop is determined a pseudo range 715 noted $\tau_{BOC}$.

A second pseudo range $\tau_{expected}$ 802 is used as an input of a circuit 810 configured to measure a difference between two pseudo ranges.

This pseudo range can be determined from non-GNSS information received from sources internal or external to the receiver. These non-GNSS information comprise at least a receiver position, a satellite position, and a time information. The equipments delivering such information are, for example, an inertial station, a local clock, known check points, . . . .

From these information, the expected pseudo range $\tau_{expected}$ is constructed, using the formula:

$$\tau_{expected} = \|X_r - X^s\| + c^* \Delta t_r,$$

where:

c is the speed of light,
$\Delta t_r$ is a time difference between the receiver and the GNSS system time,
$X_r$ is the position of the receiver,
$X^s$ is the position of the satellite, The second pseudo range $\tau_{expected}$ can also be determined from a selection of satellites not affected by the ambiguity, using for example BPSK-like discriminators to determine a position and time, and constructed from these information using the formula above.

This expected pseudo range is non-ambiguous.

A second discrimination circuit 810 measures the difference $\tau_{expected} - \tau_{BOC}$, the sign of which is used with the amplitude of the ambiguous discriminator to calculate an intermediate non-ambiguous discriminator 820. The precision of $\tau_{expected}$ can be lower than the precision of $\tau_{BOC}$, but a high precision measurement is not required, as only the sign of the difference is used to construct the intermediate non-ambiguous discriminator.

As on FIG. 6, the measured difference, as well as the expected pseudo range $\tau_{expected}$, can be smoothed over successive measurements, in order to improve the robustness.

To cope with the issue of the null value of the intermediate non-ambiguous discriminator, a second non-ambiguous discriminator 821 is used alternately to construct the first non-ambiguous discriminator 820. This second non-ambiguous discriminator is the measured difference $\tau_{expected} - \tau_{BOC}$.

Figure 9:
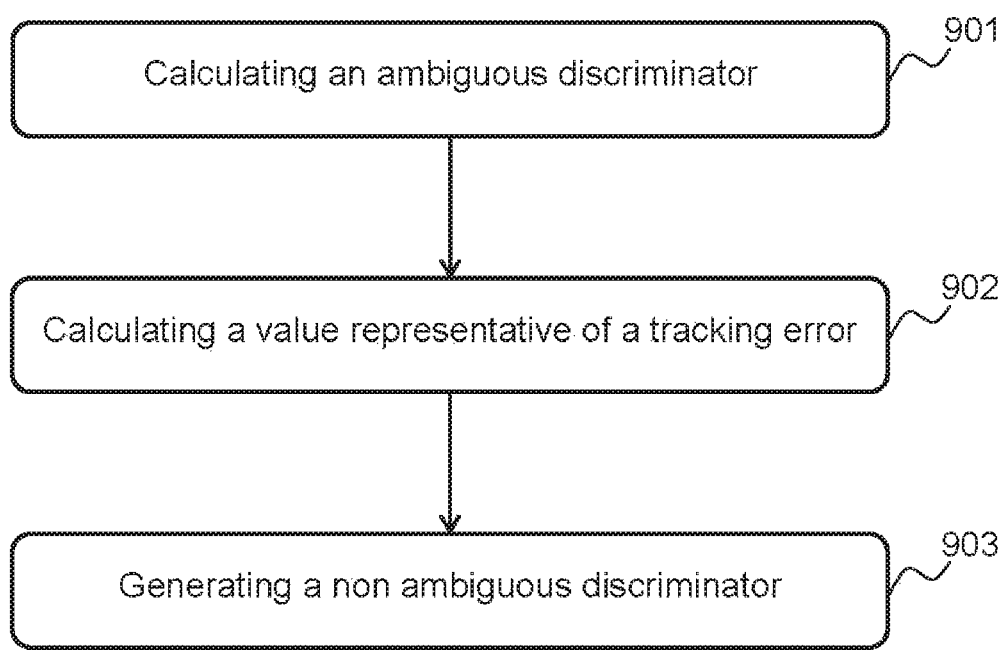
FIG. 9 represents a flow chart of an embodiment of the invention.

FIG. 9 represents a flow chart of an embodiment of the invention.

The method comprises a first step 901 of calculating an ambiguous discriminator on the subcarrier and the spreading code of a GNSS positioning signal. This ambiguous discriminator is obtained from correlating the received GNSS positioning signal with a reference signal, the reference signal being constructed from the phase of a clock included in the tracking loop.

The method also comprises a second step 902 of calculating a value representative of a tracking error of the GNSS positioning signal. This value can be obtained calculating a non-ambiguous discriminator, as in FIG. 5, or measuring a difference between a first pseudo range from the GNSS positioning signal tracking loop, and a second pseudo range from a tracking loop based on a non-ambiguous discriminator, as in FIG. 7, or from aiding (namely external) inputs, as in FIG. 8.

The method further comprises a third step of generating a first non-ambiguous discriminator value, an amplitude of which is based on one of said ambiguous discriminator calculated in the first step and said value representative of a tracking error calculated in the second step, and a sign of which is a sign of the value representative of a tracking error of said GNSS positioning signal calculated in the second step. In this step, the amplitude used for determining the amplitude of the first non-ambiguous discriminator value, is alternately the amplitude of the ambiguous discriminator, and the amplitude of the non ambiguous discriminator. Selection between the two discriminators is performed based on a probability law, or a repetitive schema. Most of the time, the amplitude of the ambiguous discriminator is selected, the amplitude of the second non-ambiguous discriminator being used to cope with the null value of the ambiguous discriminator.

The method is implemented in a calculation machine, like for example a DSP, an ASIC, a processor, microprocessor, or a FPGA, taking as input a digital GNSS positioning signal.

The invention claimed is:

1. A receiver for tracking a GNSS positioning signal comprising a carrier modulated by a subcarrier and a spreading code, the receiver comprising:
   at least one tracking loop configured to calculate a first pseudo range from said GNSS positioning signal,
   a first discrimination circuit configured to calculate an ambiguous discriminator value from the subcarrier and the spreading code of said GNSS positioning signal,
   a calculation circuit configured to calculate a non-ambiguous value representative of a tracking error of said tracking loop,
   a second discrimination circuit configured to select alternately one of said ambiguous discriminator value and said value calculated by the calculation circuit, and to generate a first non-ambiguous discriminator value, an amplitude of which is based on an amplitude of the selected value, and a sign of which is a sign of said value calculated by the calculation circuit, the first pseudo range being calculated using said first non-ambiguous discriminator.

2. The receiver of claim 1, wherein said second discrimination circuit selects between the ambiguous discriminator value and the value calculated by the calculation circuit based on a control signal.

3. The receiver of claim 1, wherein the value calculated by the calculation circuit is smoothed over a plurality of consecutive measurements.

4. The receiver of claim 1, wherein the value representative of a tracking error calculated by the calculation circuit is a second non-ambiguous discriminator calculated from correlations between the subcarrier and spreading code of the GNSS positioning signal and a reference signal.

5. The receiver of claim 1, wherein the value representative of a tracking error calculated by the calculation circuit is a second non-ambiguous discriminator calculated from correlations between the spreading code of the GNSS positioning signal and a reference signal.

6. The receiver of claim 1, wherein the value representative of a tracking error calculated by the calculation circuit is a measure of a difference between said first pseudo range, and a second pseudo range calculated by a tracking loop based on a second non-ambiguous discriminator.

7. The receiver of claim 1, wherein the value representative of a tracking error calculated by the calculation circuit is a measure of a difference between said first pseudo range, and a second pseudo range determined from known receiver position, satellite position and time.

8. A method determining a first non-ambiguous discriminator value for tracking a GNSS positioning signal comprising a carrier modulated by a subcarrier and a spreading code in a tracking loop of a receiver, the method comprising:
   a first step of calculating an ambiguous discriminator from the subcarrier and the spreading code of said GNSS positioning signal,
   a second step of calculating a non ambiguous value representative of a tracking error of said GNSS positioning signal,
   a third step of generating a first non-ambiguous discriminator value, an amplitude of which is selected alternately from one of said ambiguous discriminator calculated in the first step and said value calculated in the second step, and a sign of which is a sign of the value calculated in the second step.

9. The method of claim 8, wherein the second step of calculating a value representative of a tracking error of said GNSS positioning signal comprises calculating a second non-ambiguous discriminator from correlations between the subcarrier and spreading code of the GNSS positioning signal and a reference signal.

10. The method of claim 8, wherein the second step of calculating a value representative of a tracking error of said GNSS positioning signal comprises calculating a second non-ambiguous discriminator from a correlation between the spreading code of the GNSS positioning signal and a reference signal.

11. The method of claim 8, wherein the second step of calculating a value representative of a tracking error of said GNSS positioning signal comprises measuring a difference between a first pseudo range calculated by a tracking loop based on the first non-ambiguous discriminator, and a second pseudo range calculated by a tracking loop based on a second non-ambiguous discriminator.

12. The method of claim 8, wherein the second step of calculating a value representative of a tracking error of said GNSS positioning signal comprises measuring a difference between a first pseudo range calculated by a tracking loop based on the first non-ambiguous discriminator, and a second pseudo range determined from known receiver position, satellite position and time.

* * * * *